(12) United States Patent
Donnelly et al.

(10) Patent No.: US 6,308,639 B1
(45) Date of Patent: Oct. 30, 2001

(54) HYBRID BATTERY/GAS TURBINE LOCOMOTIVE

(75) Inventors: Frank Wegner Donnelly; Gerard Henry Koldyk, both of North Vancouver (CA)

(73) Assignee: Railpower Technologies Corp., Vancouver (CA)

( * ) Notice: Subject to any disclaimer, the term of this patent is extended or adjusted under 35 U.S.C. 154(b) by 0 days.

(21) Appl. No.: 09/558,376

(22) Filed: Apr. 26, 2000

(51) Int. Cl.[7] ........................................................ B61C 5/00
(52) U.S. Cl. .............................. 105/50; 105/61; 105/133; 105/26.05
(58) Field of Search ............................. 105/61, 104, 132, 105/35, 36, 50, 133, 139, 136; 318/139; 320/104, 132, 149; 180/65.1

(56) References Cited

U.S. PATENT DOCUMENTS

| | | |
|---|---|---|
| 1,199,752 | 10/1916 | Baker . |
| 1,377,087 | 5/1921 | Manns . |
| 1,535,175 * | 4/1925 | Mancha ............................... 105/36 |
| 2,403,933 * | 7/1946 | Lillquist ............................ 105/61 |
| 2,472,924 * | 6/1949 | Schwendner ....................... 105/36 |
| 2,510,753 * | 6/1950 | Multhaup ........................... 105/36 |
| 3,169,733 * | 2/1965 | Barrett ............................... 246/30 |
| 3,668,418 * | 6/1972 | Godard ............................... 307/66 |
| 3,898,937 * | 8/1975 | Johnson ............................. 105/61 |
| 4,090,577 * | 5/1978 | Moore ................................ 180/44 |
| 4,900,944 | 2/1990 | Donnelly . |
| 5,129,328 * | 7/1992 | Donnelly ........................... 105/61.5 |
| 5,359,228 * | 10/1994 | Yoshida ............................. 290/17 |
| 5,528,148 * | 6/1996 | Rogers ............................... 324/426 |
| 5,610,499 * | 3/1997 | Rogers ............................... 322/25 |
| 5,939,861 * | 8/1999 | Joko et al. ......................... 320/122 |

OTHER PUBLICATIONS

Herbst et al "Design, Fabrication, and Testing of 10 MJ Composite Flywheel Energy Storage Rotors", Society of Automotive ENgineers, Paper #981282 (1998).*
C. Mendler "The Technological Opportunities of Hybrid Electric Vehicles", Society of Automotive Engineers, Paper #961717 (1996).
J.D. Herbst et al. "Design, Fabrication, and Testing of 10 MJ Composite Flywheel Energy Storage Rotors", Society of Automotive Engineers, Paper #981282 (1998).
Diesel Progress, Dec. 1997, pp. 56 and 57.
Emissions—Alternative Fuels, Feb. 1996, p. 56.
Brochure for Lockheed Martin, HybriDrive Propulsion Systems.

* cited by examiner

Primary Examiner—S. Joseph Morano
Assistant Examiner—Frantz F. Jules
(74) Attorney, Agent, or Firm—Oyen Wiggs Green & Mutala

(57) ABSTRACT

Prior battery-powered electric locomotives have used multiple diesel engines to charge the batteries and have not been commercially accepted. The present invention provides a yard switcher which combines battery storage with a gas microturbine generator to provide an effective fuel-efficient and environmentally friendly locomotive. locomotive.

21 Claims, 2 Drawing Sheets

HYBRID BATTERY/GAS TURBINE LOCOMOTIVE

TECHNICAL FIELD

The invention relates to the field of locomotives and more particularly to locomotives powered by electric motors in which electric power is supplied by batteries charged by a fuel-powered generator.

BACKGROUND ART

Existing railroad locomotives are typically powered by diesel electric engines in which a diesel motor drives an electric generator to produce electric power to drive electric motors which in turn drive the drive wheels of the locomotive. The present inventor has disclosed the use of gas turbine engines fuelled by compressed natural gas in substitution for the traditional diesel engine in his U.S. Pat. No. 5,129,328 issued Jul. 14, 1992, and as a booster unit for the diesel engine in his U.S. Pat. No. 4,900,944 issued Feb. 13, 1990.

The use of electric batteries in combination with a heat engine is known for automobiles, buses and other road and highway vehicles. Such hybrid engines for vehicles are advantageous due to their increased fuel efficiency and reduced pollution. In those applications, it is important to minimize the weight of the batteries to maintain fuel efficiency. Electric batteries have been used to store electric power to drive electric locomotives. See Manns U.S. Pat. No. 1,377,087 issued May 3, 1921. In Manns, three standard diesel engines are used to drive generators to charge the storage batteries. Such a system has not achieved commercial acceptance over existing diesel electric locomotives due to the added cost and complexity of providing multiple diesel engines in addition to the storage batteries.

There is therefore a need for a fuel-efficient locomotive which uses a hybrid combination of storage batteries and a fuel-powered generator.

DISCLOSURE OF INVENTION

The present invention provides a locomotive in which a gas microturbine generator provides recharging for the batteries. More particularly, the invention provides a locomotive comprising: i) a plurality of traction motors for driving a plurality of axles; ii) a traction power controller for controlling the traction motors; iii) battery storage means for storing electric energy and supplying the electric energy to the traction motors, having an energy capacity; iv) a generator electrically connected to the battery storage means for maintaining the battery storage means in a charged state; v) means for controlling the operation of the generator by monitoring the state of charge of the battery, initiating the operation of the generator when the state of charge is below a certain limit and terminating the operation of the generator when the state of charge is above a certain limit; wherein the ratio of the charging power of the generator to the energy storage capacity is between 4 and 40 hours. Preferably the energy storage capacity is between 500 and 2000 kW hours; and the charging power of the generator is between 25 and 250 kW. Preferably the generator is one or more gas microturbines or a fuel cell/microturbine combination.

The invention also provides a method of operating a locomotive which comprises: i) a plurality of traction motors for driving a plurality of axles; ii) a traction power controller for controlling the traction motors; iii) battery storage means for storing electric energy and supplying the electric energy to the traction motors, having an energy capacity; iv) a generator electrically connected to the battery storage means for maintaining the battery storage means in a charged state; and v) means for controlling the operation of the generator by monitoring the state of charge of the battery, initiating the operation of the generator when the state of charge is below a certain limit and terminating the operation of the generator when the state of charge is above a certain limit; and wherein the ratio of the charging power of the generator to the energy storage capacity is between 4 and 40 hours, the method comprising running the generator under a constant load at its maximum power output for a sustained period of time.

BRIEF DESCRIPTION OF DRAWINGS

In drawings which disclose a preferred embodiment of the invention.

BEST MODE(S) CARRYING OUT THE INVENTION

Figure 1:
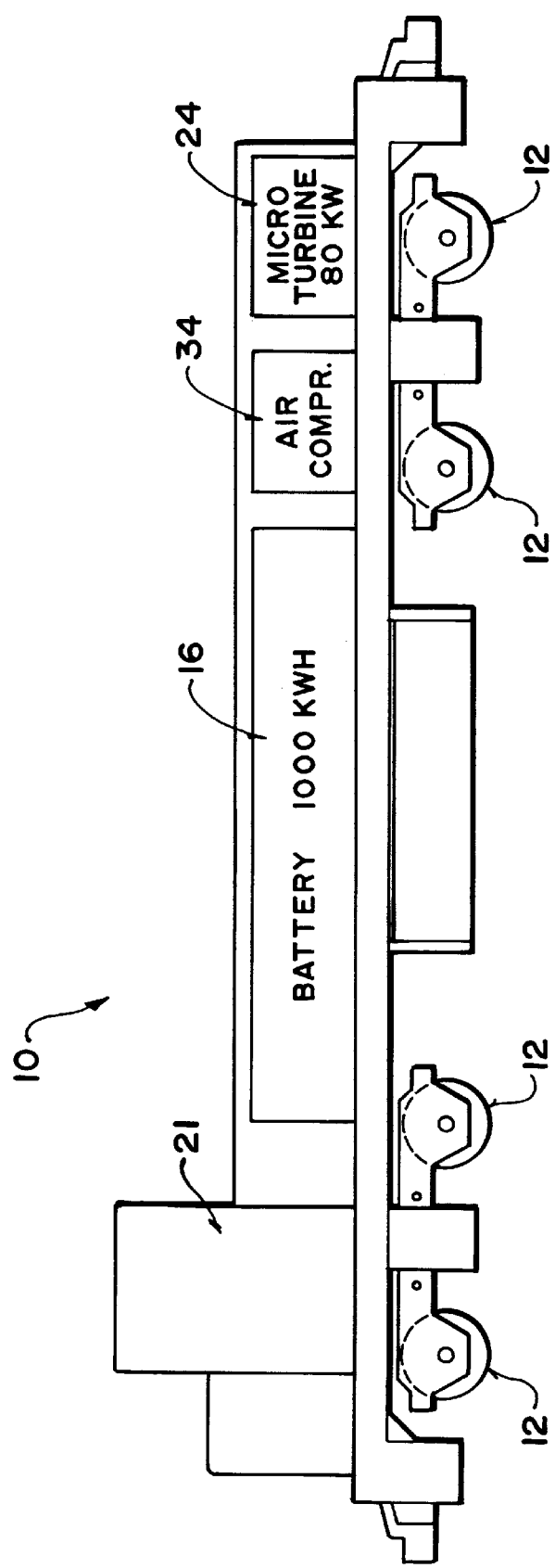
FIG. 1 is a longitudinal cross-sectional view of the locomotive according to the invention.
Figure 2:
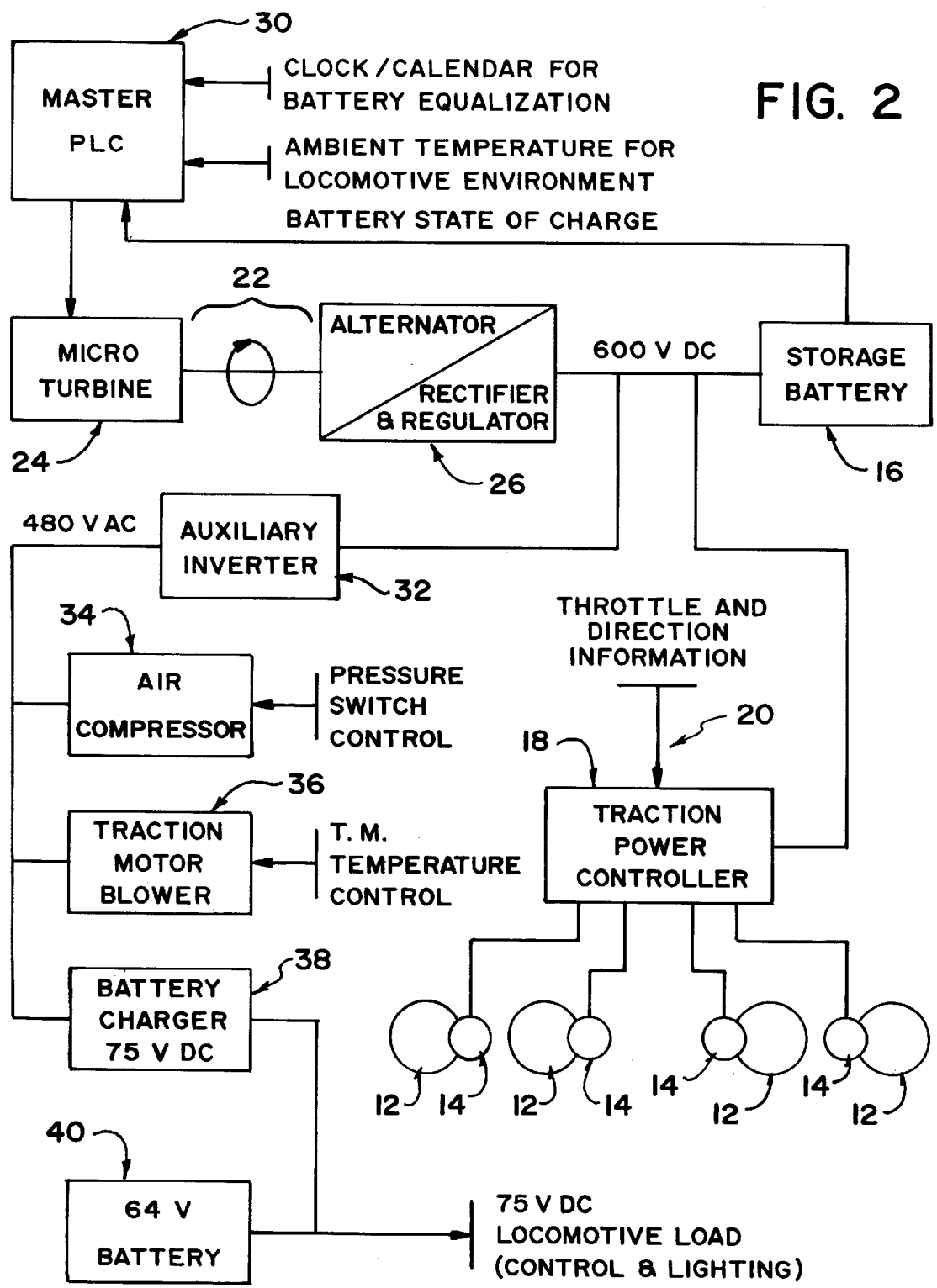
FIG. 2 is a schematic block diagram illustrating the elements of the invention.

With reference to the drawings, a locomotive 10 has wheels 12 driven by electric traction motors 14. Electric power for the traction motors is supplied by storage battery 16, which preferably has a 1,000 kWh storage capacity and may, for example, be constructed of a collection of commercially available lead acid batteries of the flooded type. Due to the needs of locomotives it is not necessary to limit the weight of the storage battery. Indeed the weight of the storage battery assists in providing the traction necessary for the locomotive function. Power for the traction motors 14 is controlled by traction power controller 18 which may use a chopper or more than one choppers. Controller 18 also controls traction motor rotation direction, wheel slip detection and correction. It is provided with a signal 20 from the locomotive cab 22 indicating throttle and direction information. Preferably it is a 1500 kW traction power controller using PWM (pulse width modulated chopper) to control both voltage and current to the traction motors. The controller 18 also contains reverser and traction motor isolation capability.

Battery 16 is charged by a microturbine generator 22 which comprises a gas microturbine 24 which drives alternator 26 to provide a 600 volt DC power supply to battery 16. By "microturbine" is meant a small gas turbine fuelled by natural gas, diesel fuel or other gaseous or liquid fuel, which operates at between 25 and 400 kW. The generator 22 keeps the battery in a range of charge states that maximizes energy efficiency and only provides, as needed, an equalizing cycle. Since batteries operate less efficiently when highly charged, a high charge state is only obtained to equalize the batteries at periodic maintenance periods. Preferably the microturbine generator is a 70 kw or 80 kw microturbine such as the POWERWORKST™ microturbines manufactured by Northern Research and Engineering Corp. division of Ingersoll Rand, or those made by Capstone, Elliott Magnetek and others. It has a rectified and regulated output. Because of the relative size of the microturbine generator it will be fully loaded at maximum efficiency for the microturbine and the generator voltage will rise in tandem with the battery voltage giving a modest charge rate for the maximum charge efficiency. The fuel supply for the natural gas turbine may be compressed gas cylinders as disclosed in U.S. Pat. No. 5,129,328. Other gaseous or liquid fuels may also be used. Also, more than one microturbine may be used. For example, two Capstone microturbines each generating 30 kW could be used instead of a single microturbine. In such applications the multiple microturbines can function as a single unit or be phased in or stepped in independently as needed.

Further, the generator may comprise a dual cycle arrangement consisting of a microturbine/fuel cell combination. In such combinations, a high temperature fuel cell serves as a combustor or high temperature source for the microturbine. An example is the hybrid generating plant developed jointly by northern Research and Engineering Corp. and Siemens Westinghouse Power Corp. which integrates a pressurized 200 kW solid oxide fuel cell with a 50 kW POWER-WORKS™ microturbine. The microturbine compressor pressurizes the fuel cell and exhaust gas at 1,500 degrees F. from the fuel cell is supplied to the turbine's gasifier and free power turbines, driving the compressor and an electric generator respectively. This results in a very fuel efficient generating plant.

The control of the microturbine generator is handled by an onboard PLC 30 (programmable logic controller) which monitors the state of the battery charge, the ambient temperature and has a clock/calendar for battery equalization. As the battery approaches its gassing voltage, which represents a high state of charge, the microturbine generator shuts down. Conversely, as the charge of battery 16 drops below a certain level the microturbine is started. A high state of charge will occur only for battery equalization maintenance when all the cells are brought up to full charge. Thus the microturbine prime mover is sized so that it will run under a constant load at the maximum power output for a sustained period of time.

Auxiliary loads draw from the battery charge source at a nominal 600 V DC which is converted by an inverter 32 to 480 V AC to run the locomotive's air compressor 34, traction motor blowers 36 and a 75 V battery charger 38, which is used to charge a 64V battery for powering the control and lighting. Inverter 32 is preferably a 50 kW plus inverter. Air compressor 34 is preferably 30 horsepower, traction motor cooling blowers 36 are preferably 20 horsepower and battery charger 38 is 5 kW.

The present invention is particularly suited to the yard switcher locomotives which do not require a long term of sustained power but rather short term power requirements which permits the continual recharging to be done by a relatively small generator. The ratio of the energy storage capacity of the storage battery 16 to the charging power source is important to achieve the goals of the invention, which is to minimize the cost, fuel consumption and emission of pollutants of the microturbine generator. The ratio of energy storage kwH to the charging power kW can be expressed as a number of hours. The optimum performance of the invention has been found to be an 8 hour charging rate period or longer, representing a maximum of 125 kW of charging power per 1000 kwH of battery storage, although down to a 4 hour charging period will be practical. Ideally the microturbine in these situations will be operating continuously for a period of at least ½ hour, and preferably without stopping (i.e. continuously for 100 hours or more). A battery energy capacity between 500 and 2000 kwH is practical depending on the space and weight constraints of the locomotive and the locomotive life-cycle cost considerations.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A locomotive comprising:
   i) a plurality of traction motors for driving a plurality of axles;
   ii) a traction power controller for controlling said traction motors;
   iii) battery storage means for storing electric energy and supplying said electric energy to said traction motors, having an energy storage capacity;
   iv) a generator having a charging power and electrically connected to said battery storage means for maintaining said battery storage means in a charged state;
   v) means for controlling the operation of said generator by monitoring the state of charge of said battery, initiating the operation of said generator when said state of charge is below a certain limit and terminating the operation of said generator when said state of charge is above a certain limit;
   wherein the ratio of the total charging power of said generator to said energy storage capacity is between 4 and 40 hours.

2. The locomotive of claim 1 wherein the ratio of the total charging power of said generator to said energy storage capacity is greater than or equal to 8 hours.

3. The locomotive of claim 1 wherein said energy storage capacity is between 500 and 2000 kW hours.

4. The locomotive of claim 1 wherein said energy storage capacity is 1000 kW hours.

5. The locomotive of claim 1 wherein the total charging power of said generator is between 25 and 250 kW.

6. The locomotive of claim 1 wherein said generator comprises a microturbine.

7. The locomotive of claim 1 wherein said generator is a microturbine.

8. The locomotive of claim 1 wherein said generator comprises two or more microturbines.

9. The locomotive of claim 1 wherein said generator is a combination microturbine/fuel cell.

10. The locomotive of claim 1 wherein said battery comprises a lead acid battery.

11. The locomotive of claim 1 which is used as a switcher locomotive.

12. The locomotive of claim 1 wherein said traction power controller controls voltage and current to the traction motors.

13. The locomotive of claim 1 wherein said means for controlling the operation of said generator comprises a PLC.

14. The locomotive of claim 1 wherein said means for controlling the operation of said generator comprises electronic or relay logic.

15. A method of operating a locomotive which comprises: i) a plurality of traction motors for driving a plurality of axles; ii) a traction power controller for controlling said traction motors; iii) battery storage means for storing electric energy and supplying said electric energy to said traction motors, having an energy capacity; iv) a generator electrically connected to said battery storage means for maintaining said battery storage means in a charged state; and v) means for controlling the operation of said generator by monitoring the state of charge of said battery, initiating the operation of said generator when said state of charge is below a certain limit and terminating the operation of said generator when said state of charge is above a certain limit; and wherein the ratio of the charging power of said generator to said energy storage capacity is between 4 and 40 hours, said method comprising: running said generator under a constant load at its maximum power output for a sustained period of time.

16. The method of claim 15 wherein said operation is modified only during a period of battery equalization.

17. The method of claim 15 wherein said sustained period of time is at least 30 minutes.

18. A locomotive comprising:
   i) a plurality of traction motors for driving a plurality of axles;
   ii) a traction power controller for controlling said traction motors;
   iii) battery storage means for storing electric energy and supplying said electric energy to said traction motors, having an energy storage capacity;
   iv) a generator comprising a microturbine and having a charging power and being electrically connected to said battery storage means for maintaining said battery storage means in a charged state;
   v) means for controlling the operation of said generator by monitoring the state of charge of said battery, initiating the operation of said generator when said state of charge is below a certain limit and terminating the operation of said generator when said state of charge is above a certain limit;
   wherein the ratio of the total charging power of said generator to said energy storage capacity is between 4 and 40 hours.

19. The locomotive of claim 18 wherein the ratio of the total charging power of said generator to said energy storage capacity is greater than or equal to 8 hours.

20. The locomotive of claim 18 wherein said energy storage capacity is between 500 and 2000 kW hours.

21. The locomotive of claim 18 wherein the total charging power of said generator is between 25 and 250 kW.

* * * * *